US012371629B2

United States Patent
Trevino Quintanilla et al.

(10) Patent No.: US 12,371,629 B2
(45) Date of Patent: Jul. 29, 2025

(54) PROCESS FOR THE PRODUCTION OF AN IMPROVED DIESEL FUEL

(71) Applicants: Sergio Antonio Trevino Quintanilla, Nuevo León (MX); Guillermo Gerardo Rodarte Herrera, Nuevo León (MX)

(72) Inventors: Sergio Antonio Trevino Quintanilla, Nuevo León (MX); Guillermo Gerardo Rodarte Herrera, Nuevo León (MX)

( * ) Notice: Subject to any disclaimer, the term of this patent is extended or adjusted under 35 U.S.C. 154(b) by 0 days.

(21) Appl. No.: 17/423,768

(22) PCT Filed: Jan. 31, 2020

(86) PCT No.: PCT/MX2020/000005
§ 371 (c)(1),
(2) Date: Jul. 16, 2021

(87) PCT Pub. No.: WO2020/159350
PCT Pub. Date: Aug. 6, 2020

(65) Prior Publication Data
US 2022/0112438 A1    Apr. 14, 2022

Related U.S. Application Data

(60) Provisional application No. 62/799,910, filed on Feb. 1, 2019.

(51) Int. Cl.
*C10L 1/19* (2006.01)
*B01F 23/41* (2022.01)
(Continued)

(52) U.S. Cl.
CPC .......... *C10L 1/191* (2013.01); *B01F 23/413* (2022.01); *B01F 23/4145* (2022.01);
(Continued)

(58) Field of Classification Search
CPC ...... C10L 1/191; C10L 1/1608; C10L 1/1905; C10L 10/06; C10L 10/08; C10L 10/12;
(Continued)

(56) References Cited

U.S. PATENT DOCUMENTS

| 6,562,086 B1 | 5/2003 | Gentry et al. |
| 2010/0037513 A1* | 2/2010 | Petrucci .................. C10L 1/328 44/301 |

(Continued)

FOREIGN PATENT DOCUMENTS

| CN | 105332840 A | 2/2016 |
| DE | 4240582 A1 | 6/1994 |

(Continued)

OTHER PUBLICATIONS

HighPressureHomogenationbySonicCorporationBrochure(2017) (Year: 2017).*

(Continued)

*Primary Examiner* — Latosha Hines
(74) *Attorney, Agent, or Firm* — Workman Nydegger

(57) ABSTRACT

A method for the continuous production of an improved diesel fuel, having enhanced ignition characteristics, more particularly with a greater electric conductivity, enhanced cetane numbers and lubricity and with greater percentage of complete combustion, resulting in less soot production and NOx reduction at the same time in an internal combustion diesel engine, breaking the tradeoff in the emission of those two pollutants from an internal combustion diesel engine.

17 Claims, 6 Drawing Sheets

(51) Int. Cl.
| | |
|---|---|
| *B01F 25/46* | (2022.01) |
| *B01J 3/08* | (2006.01) |
| *B01J 19/00* | (2006.01) |
| *B01J 19/10* | (2006.01) |
| *C10L 1/16* | (2006.01) |
| *C10L 10/06* | (2006.01) |
| *C10L 10/08* | (2006.01) |
| *C10L 10/12* | (2006.01) |

(52) U.S. Cl.
CPC ............... *B01F 25/46* (2022.01); *B01J 3/08* (2013.01); *B01J 19/008* (2013.01); *B01J 19/10* (2013.01); *C10L 1/1608* (2013.01); *C10L 1/1905* (2013.01); *C10L 10/06* (2013.01); *C10L 10/08* (2013.01); *C10L 10/12* (2013.01); *C10G 2300/4012* (2013.01); *C10G 2400/04* (2013.01); *C10L 2200/0446* (2013.01); *C10L 2230/20* (2013.01); *C10L 2290/24* (2013.01); *C10L 2290/34* (2013.01)

(58) Field of Classification Search
CPC ......... C10L 2200/0446; C10L 2230/20; C10L 2290/24; C10L 2290/34; C10L 1/026; C10L 1/106; C10L 1/125; C10L 1/1832; C10L 1/1881; C10L 1/1985; C10L 1/2225; C10L 1/328; C10L 10/02; C10L 2250/084; C10L 2250/086; C10L 2270/026; B01F 23/413; B01F 23/4145; B01F 25/46; B01J 3/08; B01J 19/008; B01J 19/10; B01J 19/18; C10G 2300/4012; C10G 2400/04; C10G 29/22; C10G 31/08

See application file for complete search history.

(56) References Cited

U.S. PATENT DOCUMENTS

| | | |
|---|---|---|
| 2012/0167648 A1 | 7/2012 | Cantizani |
| 2016/0046878 A1 | 2/2016 | Lott |

FOREIGN PATENT DOCUMENTS

| | | |
|---|---|---|
| WO | 2014168889 A1 | 10/2014 |
| WO | 2015053649 A1 | 4/2015 |

OTHER PUBLICATIONS

IKAMixingandProcessingTechnology(available2016perthewayback machine) (Year: 2016).*

International Search Report and Written Opinion from PCT Application No. PCT/MX2020/000005, Sep. 21, 2020.

Avvaru et al., "Current Knowledge and Potential Applications of Cavitation Technologies for the Petroleum Industry," Ultrasonics Sonochemistry, vol. 42, Dec. 5, 2017, pp. 493-507.

* cited by examiner

PROCESS FOR THE PRODUCTION OF AN IMPROVED DIESEL FUEL

BACKGROUND OF THE INVENTION

Field of the Invention

The present invention is related to systems and methods for upgrading hydrocarbon fuels for internal combustion engines, and more particularly to a process for the continuous production of an improved diesel fuel, having enhanced ignition characteristics, more particularly having a greater electric conductivity, and/or lubricity, allowing a greater percentage of complete combustion, resulting in less soot production and NOx reduction at the same time when burned in an internal combustion diesel engine with negligible power loss.

Description of the Related Art

Diesel fuel is one of the most used liquid hydrocarbon fuels in the world. The main problem of using diesel on internal combustion; either heavy or light duty, on or non-road engines is the fact that there is a trade off on the solid carbon particles (soot), and Nitrogen Oxides (NOx) emissions. If it's needed to emit less soot, the temperature of the combustion chamber of the engine may be increased, letting it to burn better. The soot emission would drop down but the chamber would get more oxidant, that means that the NOx emission would go up significantly. The opposite effect would occur if we reduce the temperature of the combustion chamber, the NOx emission would drop down and the soot formation would be much higher.

The previous art shows some efforts to address the above referred problem.

For example, PCT patent publication No. WO2014168889A1 (Document D1) discloses a method for fuel cracking and optimization trough molecular rupture and recombination of fuels with additives or fuel enhancers comprising: preheating fuel; mixing said preheated fuel with water and at least one additive until a micro-emulsion mixture is formed; passing said mixture through a pump until a desired pressure is reached; and directing the mixture to a hydrodynamic cavitation reactor where cavitation bubbles are formed and depolymerization and new polymeric chain formation occurs providing modified fuel. D1 alleges that the disclosed method: increases the fuel volume using non-expensive additives; improves the API index; creates "cleaner" fuels; reduces undesirable elements in fuel such as: sulfur, CO, Ox, and carbon particulate at the moment of combustion and crude oil viscosity; improves the heating value; increases the Cetane level in D6 and D2 fuels; can increase the octane levels in lighter fuels; and reduces associated system maintenance due to a cleaner combustion process.

However, the method disclosed in document D1 has several deficiencies, for instance:

D1 does not adequately and clearly describe what does "Cavitation" means since it only describes it as a bubble generating device, however, D1 does not mention the ideal process conditions to achieve the effect they are looking for. Nor is there a technically reasonable explanation of what the cavitation reactor does.

D1 does not describe the additives or fuel improvers that are added, they only mention a series of pure substances such as water, methanol etc. These substances are not additives because they do not add any property to the fuel.

D1 mentions a molecular break and depolymerization and subsequent re polymerization of diesel. Firstly, diesel does not contain polymer molecules to break, in any case, diesel is not a polymer. It is also not desirable to break the molecules since it would lose its calorific value. All these technical arguments are based on the false assumption that diesel is a polymer or contains polymeric molecules. No one with knowledge in hydrocarbons would consider this semantics as adequate, nor the arguments as valid.

All of the benefits described in D1 do not have a clear objective, it seems that they are modifying the fuel to "improve" combustion, but they do not explain what they mean by "improving".

D1 mentions that the modified fuel "allows" less CO, NOx and $SO_2$ emissions to be generated. Reducing CO is of little interest because modern engines currently do not generate that gas. The reduction of NOx is relevant, but D1 does not prove such effect, nor is there an explanation that makes sense to achieve that effect. The reduction in the emission of $SO_2$ is also an inaccuracy because this emission depends on the concentration of sulfur in the fuel. There is no modification, or molecular breakdown that can be done to the diesel that would produce the effect of halting the production of sulfur oxides. Only separating the fuel and generating another stream of sulfur, would allow to reduce the sulfur concentration. Another imprecision is that engines very rarely generate $SO_2$, the emission of SO3 is more common. Also the reduction percentages D1 shows also lack a logical explanation that justifies it.

PCT patent publication No. WO2015053649 (document D2) describes cavitation reactors intended for preparing various water-containing fuel mixtures for combustion in internal combustion engines and boilers, and also for removing micro-particles and nano-particles of petroleum and petroleum products from water. D2 discloses that if flooded water-oil mixtures are subjected to high-intensity hydro-mechanical treatment in the cavitation field (cavitation processing), then they turn into an alternative type of fuel in the form of an oil-water emulsion, in which water passes into a finely dispersed phase that has a positive effect on the combustion of liquid fuel at the micro level (both on the scale of one drop and in the process of group burning of droplets in a torch).

D2 discloses the production of a fuel emulsion, which are widely known. The concentration of water in the emulsions disclosed by D2 is very high (above 8%), which produce very known effects when burning fuels like the fuel oil described in D2.

US patent application No. 20160046878 (document D3) disclose systems and methods for upgrading or improving the quality of a heavy oil feedstock. The systems and methods described in D3 utilize cavitation energy, such as ultrasonic cavitation energy, to transmit ultrasonic or other cavitation energy (e.g., cavitation forces, shear, microjets, shockwaves, micro-convection, local hotspots, and the like) into heavy oil to drive hydroconversion under low pressure hydrogen condition (e.g., less than 500 psig) that are not conventionally believed to be suitable for treating heavy oil.

D3 discloses modifying heavy crude oil which do not lead to any definite improvement. It just mentions that they improve the heavy crude oil with the use of cavitation. It is not focused on combustion. On the other hand, D2 confuses hydrodynamic cavitation with ultrasound. They are different phenomena.

There have been also many scientific efforts in the world to solve this problem but none of those have had success due to the fact that many of the technologies who can decrease soot without increasing NOx basically decrease the calorific power of the fuel by about 20% and they also let the fuel to get out of specifications in many parameters. They are definitely technically not viable.

In view of the above referred problems and needs, the applicant developed a method for the continuous production of an improved diesel fuel, having enhanced ignition characteristics, more particularly having greater electric conductivity, and enhanced lubricity allowing greater percentage of complete combustion.

The method of the present invention comprises mixing and homogenizing diesel fuel with two special additives and submitting the mixed and homogenized mix to controlled cavitation inside a Shock Power Reactor having a rotor, in order to obtain an improved bipolar diesel fuel. Using the improved diesel fuel in internal combustion engines allows a reduction of the total soot and total P.M. emissions by more than 30% as well as total Nitrogen Oxides (NOx) emissions. The improved diesel fuel breaks the tradeoff of NOx and soot production in a diesel combustion engine with a fuel penalty of from 0 to 3%.

SUMMARY OF THE INVENTION

It is therefore a main object of the present invention to provide a method for the continuous production of an improved diesel fuel, having enhanced ignition characteristics more particularly having greater electric conductivity and enhanced lubricity which allows a greater percentage of complete combustion, resulting in less soot production and NOx reduction at the same time.

It is also a main object of the present invention to provide a method for the continuous production of an improved diesel fuel of the above referred nature, which comprises mixing and homogenizing diesel fuel with two special additives and submitting the mixed and homogenized mix to controlled cavitation inside a Shock Power Reactor having a rotor, in order to obtain an improved bipolar diesel fuel.

It is also an additional object of the present invention, to provide a method for the continuous production of an improved diesel fuel of the above referred nature, wherein the improved diesel fuel allows a reduction of the total soot and total P.M. emissions by more than 30% as well as total Nitrogen Oxides (NOx) emissions when used in internal combustion engines.

It is another main object of the present invention, to provide a method for the continuous production of an improved diesel fuel of the above referred nature, wherein the improved diesel fuel breaks the tradeoff of NOx and soot production in a diesel combustion engine with a fuel penalty of from 0 to 3%.

These and other objects and advantages of the method for the continuous production of an improved diesel fuel of the present invention will become apparent to those persons having an ordinary skill in the art, from the following detailed description of the embodiments of the invention which will be made with reference to the accompanying drawings.

DETAILED DESCRIPTION OF THE INVENTION

Figure 1:
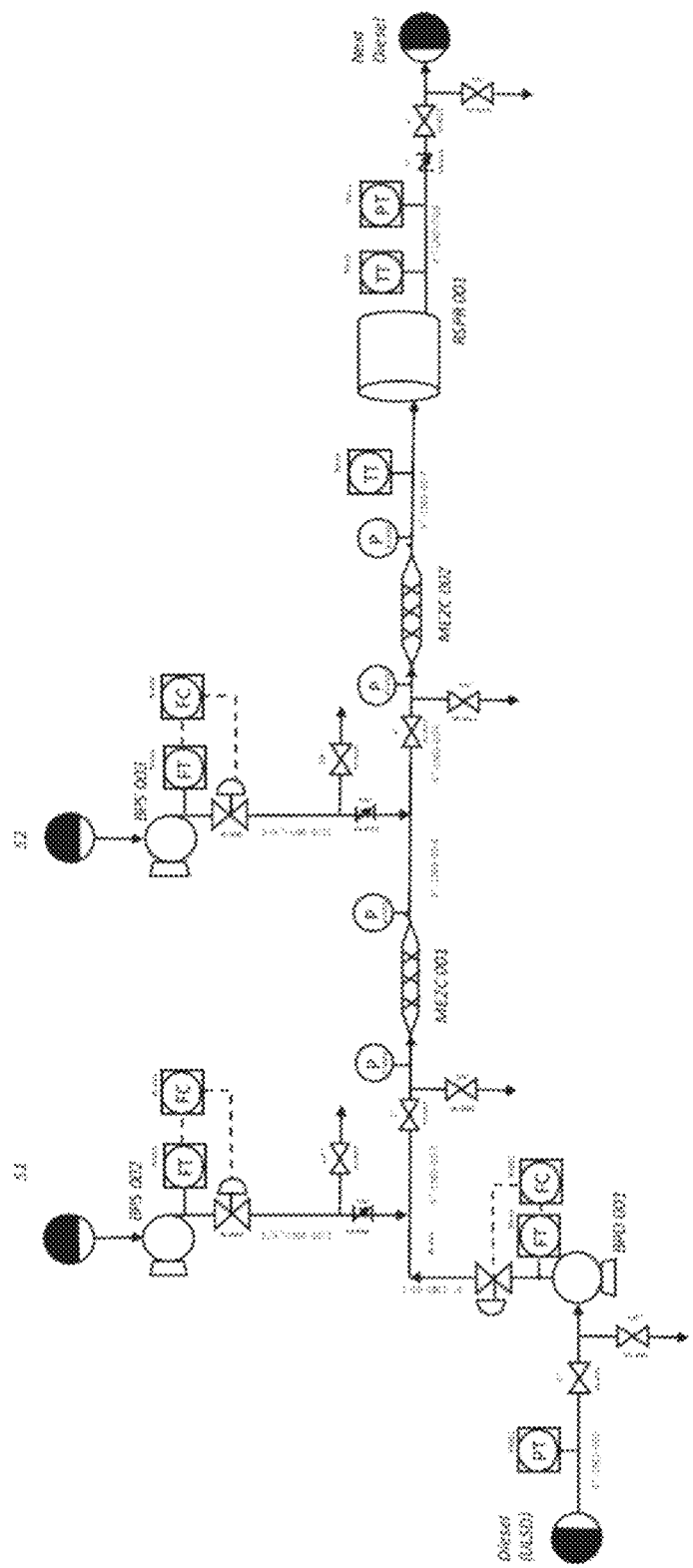
FIG. 1 is a flow diagram of the method for the continuous production of an improved diesel fuel of the present invention.

The improved diesel fuel of the present invention is based on "regular" commercial diesel with the addition of two mixtures of components. These components will be addressed as "S1" (corresponding to additive number 1) and "S2" (corresponding to additive number 2).

"S1" comprise a an Ethoxylated Fatty Acid Ester that can be ethoxylated with a range of 6 to 80 moles of Ethylene Oxide. This molecule is formed from 1,4-anhydro-sorbitol and fatty acids (see Formula 1). Typically, this substance consists of a mixture of stearic and palmitic acid esters of sorbitol and its mono- and dianhydrides. This ethoxylated derivatives can also be prepared by the addition of several moles of ethylene oxide to the form of monoglycerol ester and, depending on the number of moles of ethylene oxide added, have a wide range in HLB value.

Formula 1

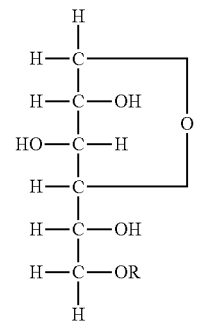

Graphic representation of S1 where "R" represents a fatty acid (lauric, palmitic, oleic or stearic)

S2 is a complex water based mixture formed by aromatic solvents such as para "p-" or Ortho "o-" Xylene with one or two methyl radicals mixed with a balance of four Ethoxylated Phenol derived surfactants (see Formula 2) that can be Alkyl type chains or Nonyl type as well. The chemical balance of the surfactants should be formulated to match with the HLB value of S1.

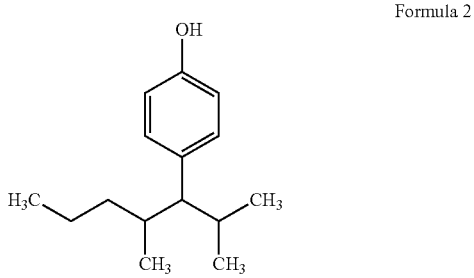

Example of one of this surfactants (4-(2,4-dimethylheptan-3-yl)phenol)

The water concentration on S2 should be by the rage of 50 to 90% and the water is added in a form of an amine soap. The amine soap should be prepared in a chemical reactor where a viscous organic compound that is both a tertiary amine and a triol with three alcoholic groups (see the Graphic representation below) would be neutralized by an aliphatic fatty acid with one double bond and an Alkyl chain of 6 to 18 carbons.

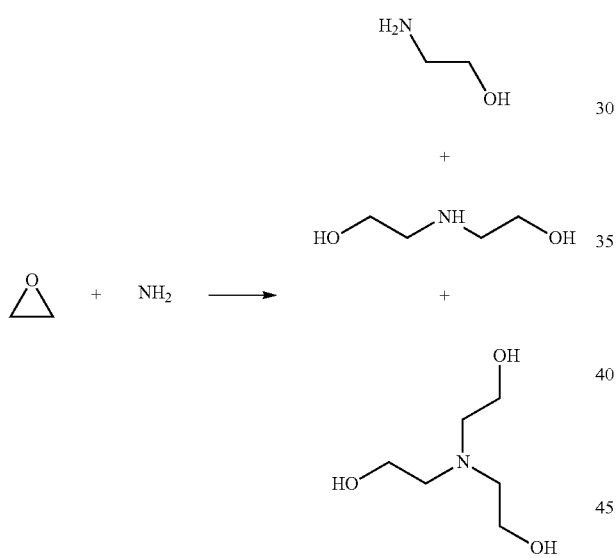

Graphic Representation of the Formation of the Tertiary Amine

S1 is a non-polar substance and S2 is a bipolar mixture. Both substances create a complex molecular dispersion with diesel fuel or ultra-low diesel fuel.

Both additives are injected to the main process flow and mixed thoroughly by means of a Shock Wave Power Reactor (SPR).

The process of the present invention will now be described in accordance with a specific embodiment thereof, designed to process a continuous stream of diesel, wherein the process of the present invention comprises the following steps:

a) providing a continuous main stream (SD) of a (non-polar) commercial Diesel fuel (also Ultra Low Sulfur diesel (ULSD) can be used) at a pressure of 60-100 psig by means of a Helicoidal Gear Pump (BPS 002) having a 40 HP motor with a maximum flow of between 35 to 350 gallons/min and an operating pressure of 60-100 psig. The pump receives diesel from a constant volumetric flow source (a tank ULSD) in a range of 4 to 1400 L/min at ambient temperature and at the hydrostatic pressure of the tank (minimum of 1 psi). The main stream (SD) flows through a 4" pipe, although other pipes having different diameter may be used depending on the scale of the entire process;

b) measuring the flow of the main stream (SD) by means of a 4 in. "V Shape" Coriolis Mass Flow meter and regulating the main flow by means of a main flow control valve NPS 4 in. 150 class standard RF flange connection. The main flow is regulated at a pressure of 20-90 psig. i.e. the same pressure provided by the Helicoidal Gear Pump;

c) providing a stream of the S1 component by means of a Progressive Cavity Injection Pump (BPS 002), having a 5 HP motor with a maximum proportional flow of between 0 to 5 gallons/min (preferably 4.55 gallons/min) and an operating pressure of between 25 to 120 psig (preferably 100 psig), which must be greater that the pressure of the main stream (SD). The Progressive Cavity Injection Pump receives the S1 component from a tank at a hydrostatic pressure of the tank at ambient temperature;

d) measuring the stream of the S1 component by means of a 1 in. straight Coreolis Mass Flow meter, regulated with a control valve NPS ¾ in. which regulates the stream of the S1 component at a maximum pressure of between 25 to 125 psig (preferably 100 psig).

e) injecting the stream of the S1 compound to the mainstream (SD) 4" pipe by means of a standard "T" connector, at a pressure of between 25 to 125 psig (preferably 100 psig), which must be greater than the pressure of the main stream, and at a position located after the main flow control valve, in order to create a stream of SD+S1 having a maximum mass flow of between 35 to 400 gal/min (preferably 359.55 gal/min), wherein the input mass flow will correspond to 0.9 to 1.5% of the SD in flow.

f) mixing and homogenizing the stream of SD+S1 by means of a first static mixer (MEZC 001) having approximately 120 cm long, 4 in. diameter with 5 PMS blade units and 150 class standard RF flange connection and producing a pressure drop of approximately 8 psig in order to create a mixed stream of SD+S1 of between about 20 to 110 psig (preferably 67 psig);

g) providing a stream of the S2 component by means of a Progressive Cavity Injection Pump, (BPS 003) having a 3 HP motor with a maximum flow of between 0 to 10 gallons/min (preferably 8.75 gallons/min) and an operating pressure of between 25 to 125 psig (preferably 100 psig). The Progressive Cavity Injection Pump receives the S2 component from a tank at a hydrostatic pressure of the tank at ambient temperature;

h) measuring the stream of the S2 component by means of a ¾ in. straight Coreolis Mass Flow meter, regulated with a control valve NPS ¾ in. 150 class standard RF flange connection which regulates the stream of the S2 at a pressure of between 25 to 125 psig (preferably 100 psig).

i) Injecting the stream of the S2 component to the stream of SD+S1 to the 4" pipe by means of a standard "T" connector, at a pressure of between 25 to 125 psig (preferably 100 psig) which must be greater than the pressure of the main stream, at a position located after the first static mixer in order to create a stream of SD+S1+S2 at a maximum mass flow of 400 gal/min, wherein the input mass flow of the S2 component will correspond approximately to 1.5 to 3.0% of the SD+S1+S2 flow.

j) mixing and homogenizing the stream of SD+S1+S2 by means of a second static mixer (MEZC 002) having approximately 87 cm long, 4 in. diameter with 3 PMS blade units and 150 class standard RF flange connection and generating a pressure drop of approximately 4 psig, thus producing a mixed stream of SD+S1+S2 having a pressure of between 25 to 125 psig (preferably about 63 psig) at ambient temperature;

k) feeding the stream of SD+S1+S2 having a pressure of 25 to 125 psig (preferably about 63 psig) at ambient temperature to a Shock Wave Power Reactor (SPR) in order to submit the stream to "controlled cavitation" which converts a non-polar diesel fuel into a bipolar diesel fuel that increases the lubricity parameter by more than 40%. The SPR reactor comprises a rotor that spins at a velocity of between 600 RPM and 3000 RPM. The spinning action generates hydrodynamic cavitation in the rotor cavities away from the metal surfaces. The cavitation is controlled and therefore there is no damage. As microscopic cavitation bubbles are produced and collapse, shockwaves are given off into the liquid which can heat and/or mix" (Hydrodynamics, 2018). This equipment guarantees the homogeneous mixing of the stream of SD+S1+S2 and the result is the improved diesel fuel having a temperature of between about 30° C. to 80° C., which correspond to an increase of temperature of approximately 30° C.

In other embodiments of the process of the present invention, In step e) and i) the component S1 is always injected at a pressure greater or slightly greater that the pressure of the main stream (SD), and the component S2 is always injected at a pressure greater or slightly greater that the pressure of the SD+S1 stream.

Although it was described that the process is designed to process a continuous stream of diesel, it may be possible to process the diesel in batches.

The improved diesel fuel produced by the method of the present invention has enhanced ignition characteristics, more particularly a greater electric conductivity of more than 1000 times compared with regular diesel fuel and a value of lubricity of more than 100% compared with regular diesel fuel, with greater percentage of complete combustion, resulting in less soot production and NOx reduction at the same time in an internal combustion diesel engine.

Said improved diesel fuel obtained by the process of the present invention is a bipolar diesel fuel having a lubricity parameter of approximately 0.300 mm.

The improved diesel fuel has proven tests on engines based on EPA and CARB standard cycles that the effect of this fuel based on a on regular ULSD reduces the total soot and total P.M. emissions by more than 30% as well as total Nitrogen Oxides (NOx) emissions. The improved diesel (ND) breaks the tradeoff of NOx and soot production in a diesel combustion engine with a fuel penalty of from 0 to 3%.

The characteristics of the improved diesel fuel that differentiates it from the base fuel is that, with an observation under the microscope, the dispersion of polar particles can be observed, this is what gives it the bipolar character.

As previously described, it can also see an increase of more than 1000 times in the electrical conductivity with respect to the base fuel, without the need to add additives. This is measured according to ASTM D2624.

The lubricity measured by ASTM D6079 is much higher without the need to add lubricity additives.

Specifications of the Improved Diesel of the Present Invention

| | | | IMPROVED DIESEL |
|---|---|---|---|
| D130 Fuels | PSponCd | | 1A |
| | Copper | | |
| | Duration | hours | 3 |
| | Temperature | deg C. | 50 |
| D1319 | Aromatic | % | 30.5 |
| | Olefins | % | 2.4 |
| | Saturate | % | 67.1 |
| D2500 | Comment | 1 | OBSERVED LIGHT RING @ +6 ABOVE BASE OF VESSEL BUT A DISTINCT CLOUD @ −10 |
| D2622 | Sulfur | mass % | 0.001 |
| | SulfurPP | PPM | 9.74 |

| D2709 | TtlSmpl | Vol % | <0.005 |
|---|---|---|---|
| D445 40 c | Viscosty | cSt | 2.655 |
| D482 | Ash | mass % | IC |
| D6079 | MjrAxis | mm | 0.278 |
| | MnrAxes | mm | 0.205 |
| | WearScar | mm | 0.242 |
| | DescScar | • | Evenly Abraded Oval |
| D613 | CetaneNo | | 46 |
| D86 | IBP | deg F. | 203.7 |
| | Evap_5 | deg F. | 367.2 |
| | Evap_10 | deg F. | 406.7 |
| | Evap_15 | deg F. | 424.4 |
| | Evap_20 | deg F. | 433.5 |
| | Evap_30 | deg F. | 453.1 |
| | Evap_40 | deg F. | 469.9 |
| | Evap_50 | deg F. | 493.2 |
| | Evap_60 | deg F. | 511.4 |
| | Evap_70 | deg F. | 535.1 |
| | Evap_80 | deg F. | 560.4 |
| | Evap_90 | deg F. | 594.3 |
| | Evap_95 | deg F. | 629.9 |
| | FBP | deg F. | 650.1 |
| D93 | Flash | deg F. | 149 |
| | FlashP-C | deg C. | 65 |

Process Data

| Inflow | |
|---|---|
| InFlow (GPM) | 350 |
| S1 vs InFlow (%) | 0.012 |
| S2 vs InFlow (%) | 0.02 |

| Molecular weights | | |
|---|---|---|
| MW Diesel | 168.32 | g/mol |
| MW S1 | 346.47 | g/mol |
| MW S2 | 18.62 | g/mol |

| Densities | | |
|---|---|---|
| Den Diesel | 850 | kg/m3 |
| Den S1 | 1032 | kg/m3 |
| Den S2 | 1000 | kg/m3 |

| Current | 001 | 002 | 003 | 004 | 005 | 006 |
|---|---|---|---|---|---|---|
| Temperature (° C.) | 25 | 25 | 25 | 25 | 25 | 45 |
| Pressure (psig) | 75 | 100 | 70 | 100 | 65 | 52 |
| Vap Fraction | 0 | 0 | 0 | 0 | 0 | 0 |
| Vol Flow (GPM) | 350 | 4.2 | 354.2 | 7 | 361.2 | 361.2 |

| Balance of Matter | | | | | | |
|---|---|---|---|---|---|---|
| Current | 1 (Feed) | 2 (S1) | 3 | 4 (S2) | 5 | 6 |
| Temperature (° C.) | 25 | 25 | 25 | 25 | 25 | 45 |
| Pressure (Kg/cm2) | 5.27 | 7.03 | 4.92 | 7.03 | 4.57 | 3.06 |
| Vap Fraction | 0 | 0 | 0 | 0 | 0 | 0 |
| Vol Flow (LPM) | 92.46 | 1.11 | 93.57 | 1.85 | 95.42 | 95.42 |
| Mass Flow (ton/h) | 4.715 | 0.069 | 4.772 | 0.111 | 4.866 | 4.866 |
| Molar Flow (kmol/h) | 28.015 | 0.198 | 28.351 | 0.659 | 28.872 | 28.872 |
| Flows (kmol/h) | | | | | | |
| Diesel | 28.015 | 0 | 28.015 | 0 | 28.015 | 0 |
| S1 | 0 | 0.198 | 0.198 | 0 | 0.198 | 0 |
| S2 | 0 | 0 | 0 | 0.659 | 0.659 | 0 |
| Next Diesel | 0 | 0 | 0 | 0 | 0 | 28.872 |

| Viscosities | | |
|---|---|---|
| Miu Diesel | 5 | cP |
| Miu S1 | 2200 | cP |
| Miu S2 | 0.89 | cP |
| Conv L/G | 0.264172 | |

Engine Tests Using the Improved Diesel of the Present Invention

The test methods in engines are FTP (Federal Test Protocol) administered and endorsed by EPA. Tests were run in steady state (Steady State) and transient cycles (Transient).

Figure 2:
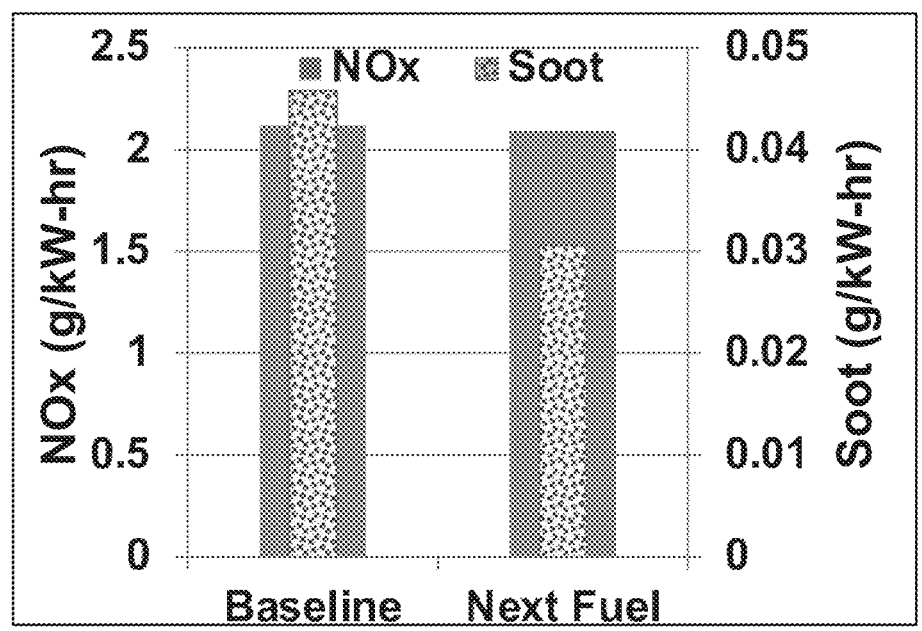
FIG. 2 is a graph showing the Steady-State Testing results of Test 1.
Figure 3:
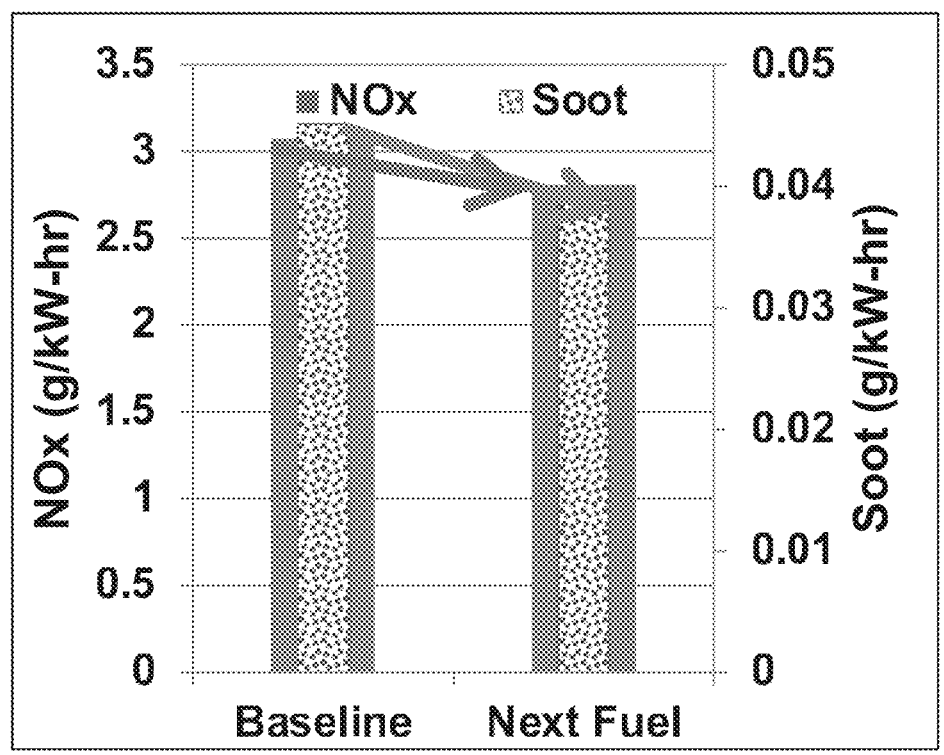
FIG. 3 is a graph showing the Transient Tests results of Test 1.
Figure 4:
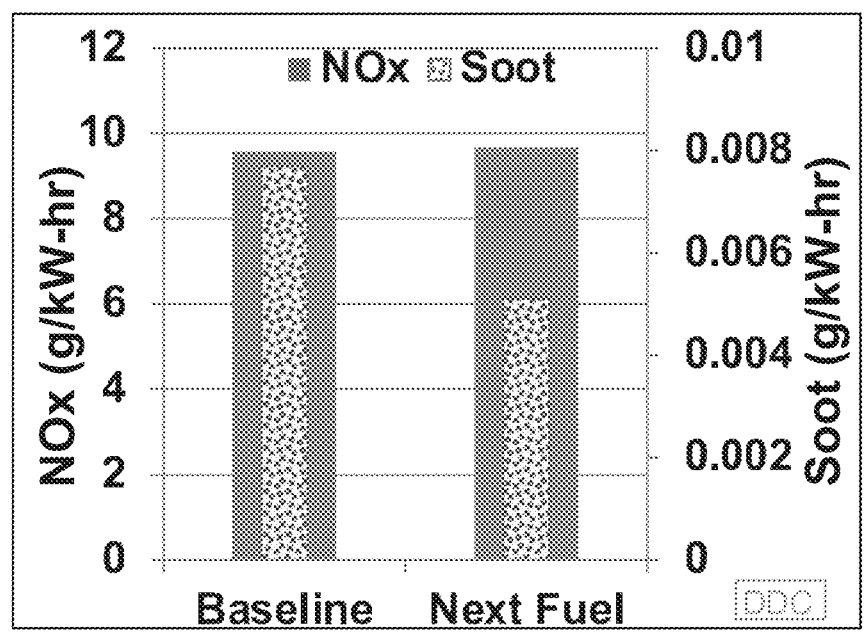
FIG. 4 is a graph showing the first Steady-State Testing of Test 2.
Figure 4:
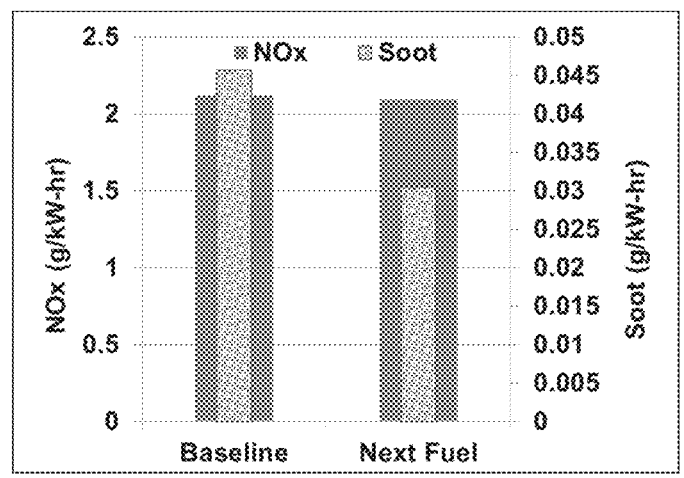
Figure 5:
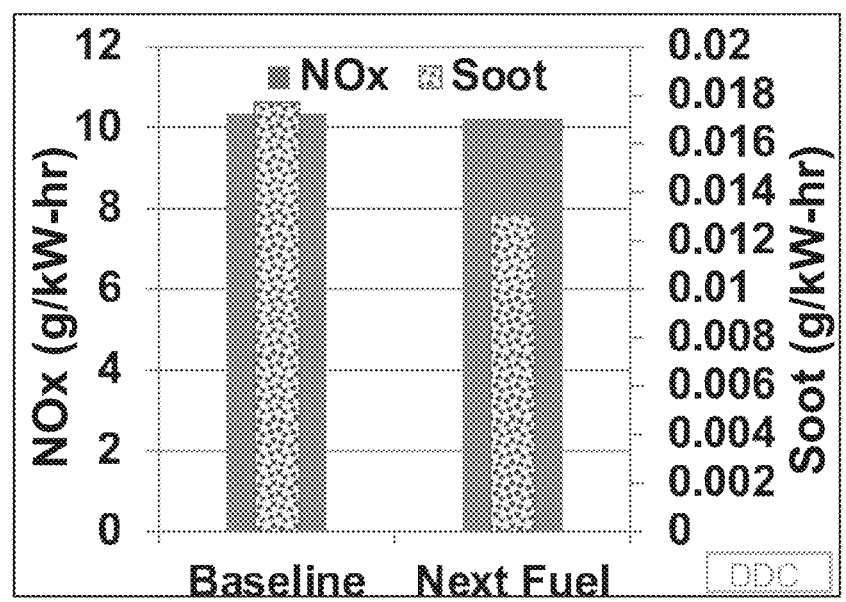
FIG. 5 is a graph showing the second Steady-State Testing of Test 2.
Figure 6:
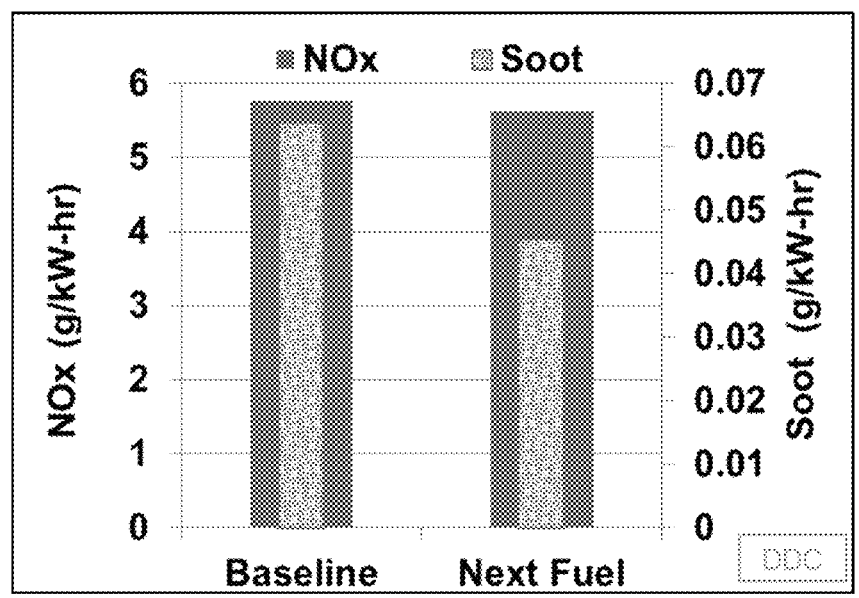
FIG. 6 is a graph showing the transient tests of Test 2.

Test 1
Navistar
   Model Year: 2016 N13
   Emissions Compliance: 2010
   Displacement, liter: 12.4
   Power Rating: 475 hp at 1700 rpm
   Exhaust Gas Recirculation (EGR)
   HPCR fuel system
Base Engine Representative of Current Production in US and Europe
Steady-State Testing
   1700 rpm and 50% load
   33% soot reduction with Next Fuel
Please refer to graph of FIG. 2
Transient Tests
   FTP testing demonstrated:
      14% less soot
      8.6% less NOX
Please refer to graph of FIG. 3
Test 2
DD series 60
   Model Year: 1998 Series 60
   Emissions Compliance: 1998
   Displacement, liter: 14.0
   Power Rating: 450 hp at 1800 rpm
   No EGR
   No aftertreatment
   Unit injectors
Representative of Legacy Fleet Inventory
Steady-State Testing 1
   1800 rpm and 25% load
   34% soot reduction with Next Fuel
   $NO_X$ and fuel consumption unchanged
Please refer to graph of FIG. 4
Steady-State Testing 2
   1200 rpm and 100% load
   26% soot reduction with Next Fuel
   $NO_x$ and fuel consumption unchanged
Please refer to graph of FIG. 5
Transient Tests
   FTP testing demonstrated:
   NOX and fuel consumption unchanged
   29% soot reduction
Please refer to graph of FIG. 6
   Analysis of Untreated Regular Diesel Carried Out by Chevron Phillips

| TESTS | RESULTS | SPECIFICATIONS | METHOD |
|---|---|---|---|
| Specific Gravity, 60/60° F. | 0.8458 | 0.840-0.8524 | ASTM D-4052 |
| API Gravity | 35.8 | 34.5-37.0 | ASTM D-1250 |
| Sulfur, PPM | 10.7 | 7-15 | ASTM D-5453 |
| Corrosion, 3-hrs @ 50° C. | 1A | 1 Max | ASTM D-130 |
| Flash Point, ° F. | 144 | 130 Min | ASTM D-93 |
| Pour Point, ° F. | −10 | 0 Max | ASTM D-97 |
| Cloud Point, ° F. | −2 | Report | ASTM D-2500 |
| Viscosity@40 c, cSt | 2.3 | 2.0-2.6 | ASTM D-445 |
| Particulate matter, mg/l | 0.0 | Report | ASTM D-6217 |
| Total Acid Number, mg KOH/g | 0.001 | 0.05 Max | ASTM D-974 |
| Strong Acid No. | 0.0 | 0 Max | ASTM D-974 |
| Ash, wt % | <0.001 | 0.005 Max | ASTM D-482 |
| istillation | | | ASTM D-86-G4 |
| IBP | 336 | Report | |
| 5% | 376 | Report | |

-continued

| TESTS | RESULTS | SPECIFICATIONS | METHOD |
|---|---|---|---|
| 10% | 393 | Report | |
| 20% | 416 | Report | |
| 30% | 441 | Report | |
| 40% | 463 | Report | |
| 50% | 483 | Report | |
| 60% | 504 | Report | |
| 70% | 526 | Report | |
| 80% | 552 | Report | |
| 90% | 588 | 560-630 | |
| 95% | 619 | Report | |
| EP | 654 | Report | |
| Loss | 0.3 | Report | |
| Residue | 1.3 | Report | |
| Cetane Number | 44 | 43-47 | ASTM D-613 |
| Cetane Index | 44.7 | Report | ASTM D-976 |
| Oxidation Stability, mg/100 ml | 0.1 | 1.5 Max | ASTM D-2274 |
| HFRR Lubricity, mm | 0.65 | Report | ASTM D-6079 |
| Water & Sediment, vol % | <0.01 | 0.05 Max | ASTM D-2709 |
| Carbon Residue on 10% Bottoms | 0.06 | 0.35 Max | ASTM D-524 |
| Carbon, wt % | 86.9 | Report | Calculated |
| Hydrogen, wt % | 13.1 | Report | ASTM D-3343 |
| Net Heat of Combustion, BTU/lb | 18,426 | Report | ASTM D-3338 |
| Polynuclear Aromatics, wt % | 9.2 | Report | ASTM D-5186 |
| SFC Aromatics, wt % | 31.5 | Report | ASTM D-5186 |
| Cold Filter Plugging Point, ° F. | −2 | Report | ASTM D-6371 |

Lot Number: 19FPDST01

Analysis of the Improved Diesel of the Present Invention (Next Diesel) Carried Out by Southwest Research Institute

| | Next-Diesel-#1 1a | Next-Diesel-#2 1a |
|---|---|---|
| ASTMD-130 Copper Strip @ 50° C., 3 hrs. ASTM D-1319 Hydrocarbon Types | Attached | Attached |
| ASTM D-2500 Cloud Point, ° C. | −10 | * |
| ASTM D-2622 Sulfur, mass % | 0.001 | 0.001 |
| ASTM D-2709 Water and Sediment Test, volume % | <0.005 | 0.05 |
| ASTM D-445 Viscosity @ 40° C., cSt | 2.66 | 2.65 |
| ASTM D-482 Ash, mass % | <0.001 | <0.001 |
| Test sample, mass g | 100.5221 | 100.0337 |
| ASTM D-6079 Lubricity (HFFR) | Attached | Attached |
| ASTM D-613 Cetane Number | 46 | 43.4 |
| ASTM D-86 Distillation Test, ° C. | Attached | Attached |
| ASTM D-93 Flash Point, ° C. | 65 | 69 |

(* Unable to run. Sample already cloudy)

Next-Diesel-#1

ASTM D1319 Hydrocarbon Types by Fluorescent Indicator Adsorption

| Saturate Content, % volume | 67.1 |
|---|---|
| Aromatic Content, % volume | 30.5 |
| Olefin Content, % volume | 2.4 |

D6079 High-Frequency Reciprocating Rig

| Fuel Temperature, ° C. | 60 |
|---|---|
| Wear Scar Major Axis, mm | 0.28 |
| Wear Scar Minor Axis, mm | 0.20 |
| Wear Scar Diameter, microns | 240 |
| Description of Wear Scar | Evenly Abraded Oval |

ASTM D86 Distillation of Petroleum Products at Atmospheric Pressure

| % Volume Evaporated | ° C. | Pressure Corrected % Volume Recovered | ° C. |
|---|---|---|---|
| IBP | 95.6 | IBP | 95.4 |
| 5 | 186.1 | 5 | 196.4 |
| 10 | 208.3 | 10 | 210.8 |
| 15 | 217.8 | 15 | 217.8 |
| 20 | 223.3 | 20 | 225.3 |
| 30 | 233.9 | 30 | 236.9 |
| 40 | 243.3 | 40 | 246.8 |
| 50 | 256.1 | 50 | 257.6 |
| 60 | 266.1 | 60 | 267.2 |
| 70 | 279.4 | 70 | 281.1 |
| 80 | 293.3 | 80 | 295.6 |
| 90 | 312.2 | 90 | 317.2 |
| 95 | 332.2 | 95 | 340.2 |
| FBP | 343.3 | FBP | 343.4 |
| Recovered, % | 98.0 | | |
| Residue, % | 0.8 | | |
| Loss, % | 1.2 | | |

Next-Diesel-#2

ASTM D1319 Hydrocarbon Types by Fluorescent Indicator Adsorption

| Saturate Content, % volume | 69.8 |
|---|---|
| Aromatic Content, % volume | 28.6 |
| Olefin Content, % volume | 1.6 |

D6079 High-Frequency Reciprocating Rig

| Fuel Temperature, ° C. | 60 |
|---|---|
| Wear Scar Major Axis, mm | 0.26 |
| Wear Scar Minor Axis, mm | 0.19 |
| Wear Scar Diameter, microns | 230 |
| Description of Wear Scar | Evenly Abraded Oval |

ASTM D86 Distillation of Petroleum Products at Atmospheric Pressure

| % Volume Evaporated | ° C. | Pressure Corrected % Volume Recovered | ° C. |
|---|---|---|---|
| IBP | 96.7 | IBP | 96.6 |
| 5 | 186.7 | 5 | 189.7 |
| 10 | 206.7 | 10 | 207.4 |
| 15 | 211.7 | 15 | 211.8 |
| 20 | 210.6 | 20 | 210.3 |
| 30 | 213.9 | 30 | 215.3 |
| 40 | 232.2 | 40 | 232.8 |
| 50 | 246.7 | 50 | 247.2 |
| 60 | 258.9 | 60 | 259.3 |
| 70 | 272.2 | 70 | 272.5 |
| 80 | 287.8 | 80 | 288.5 |
| 90 | 308.9 | 90 | 309.9 |
| 95 | 327.8 | 95 | 330.1 |
| FBP | 339.4 | FBP | 339.6 |
| Recovered, % | 98.3 | | |
| Residue, % | 1.3 | | |
| Loss, % | 0.4 | | |

The invention claimed is:

1. A process for production of an improved diesel fuel, the process comprising the steps of:
   a) mixing and homogenizing the following streams: a first stream (SD) of a petroleum-derived, ultra-low diesel fuel; a second stream (S1) of a first additive comprising a mixture of ethoxylated esters which is used as surfactant; a third stream (S2) comprising a second additive comprising an aqueous emulsion containing a mixture of water-soluble surfactants and cyclic-aromatic hydrocarbons in order to produce a mixed and homogenized stream comprising SD+S1+S2; and
   b) converting the petroleum derived ultra-low diesel fuel contained in the mixed and homogenized stream obtained in step a) into a bipolar diesel fuel by submitting the mixed and homogenized stream to controlled cavitation inside a Shock Power Reactor having a rotor, in order to obtain the improved diesel fuel;
   wherein the mixed and homogenized stream comprises 95.5 to 97.6% by mass of the petroleum-derived, ultra-low diesel fuel.

2. The process for the production of an improved diesel fuel as claimed in claim 1,
   wherein in step a), the first additive comprises an Ethoxylated Fatty Acid Ester that can be ethoxylated with a range of 6 to 80 moles of Ethylene Oxide,
   wherein its molecule is formed from 1,4-anhydro-sorbitol and fatty acids.

3. The process for the production of an improved diesel fuel as claimed in claim 1,
   wherein in step a), the second additive comprises a water based mixture formed by aromatic solvents comprising para "p-" or Ortho "o-" Xylene with two methyl radicals mixed with a balance of four Nonyl Ethoxylated Phenol derived surfactants,
   wherein the chemical balance of the surfactants should be formulated to be similar to the HLB value of the first additive.

4. The process for the production of an improved diesel fuel as claimed in claim 1,
   wherein in step a) the first stream (SD) comprises a non-polar commercial diesel (CD) at a pressure of 60-100 psig pumped by means of a a Helicoildal Gear Pump having a 40 HP motor with a maximum flow of between 35 to 350 gallons/min and an operating pressure of 60 to 100 psig,
   wherein the pump receives diesel from a constant volumetric flow source in a range of 4 to 1400 L/min at ambient temperature and at the hydrostatic pressure of the volumetric flow source (minimum of 1 psi), and
   wherein the first stream is measured by means of a Coriolis Mass Flow meter and regulated by means of a main flow control valve NPS 150 class standard RF flange connection at a pressure of 20-90 psig. at the same pressure provided by the Helicoidal Gear Pump.

5. The process for the production of an improved diesel fuel as claimed in claim 1,
   wherein in step a) the second stream (S1) is provided by means of a Progressive Cavity Injection Pump, with a maximum proportional flow of between 0 to 5 gallons/min and an operating pressure of between 25 to 120 psig,
   wherein the Progressive Cavity Injection Pump receives the first additive from a tank at a hydrostatic pressure of the tank at ambient temperature and
   wherein the second stream provided by the Progressive Cavity Injection Pump is measured by means of a straight Coreolis Mass Flow meter, regulated with a control valve, which regulates the second stream at a maximum pressure of between 25 to 125 psig.

6. The process for the production of an improved diesel fuel as claimed in claim 1,
   wherein in step a) the third stream (S2) is provided by means of a Progressive Cavity Injection Pump, with a maximum flow of between 0 to 10 gallons/min and an operating pressure of between 25 to 125 psig,
   wherein the Progressive Cavity Injection Pump receives the second additive from a tank at a hydrostatic pressure of the tank at ambient temperature and wherein the third stream provided by the Progressive Cavity Injection Pump is measured by means of a straight Coreolis Mass Flow meter, regulated with a control valve NPS 150 class standard RF flange connection which regulates the third stream of the S2 additive at a pressure of between 25 to 125 psig.

7. The process for the production of an improved diesel fuel as claimed in claim 1 wherein in step a):
   I. the second stream (S1) is injected to the first stream (SD);
   II. the resulting stream (SD+S1) is homogenized by a static mixer thus producing a homogenized stream;
   III. the third stream S2 is injected to the homogenized stream obtained in step II;
   IV. the resulting stream obtained in step III (S2+S1+S2) is homogenized by means of a static mixer.

8. The process for the production of an improved diesel fuel as claimed in claim 7,
   wherein in step I. the second stream (S1) is injected by means of a standard "T" connector, at a pressure of between 25 to 125 psig, which must be greater than the pressure of the main stream, in order to create a stream of SD+S1 having a maximum mass flow of between 35 to 400 gal/min,
   wherein the input mass flow will correspond to 0.9 to 1.5% of the SD in flow.

9. The process for the production of an improved diesel fuel as claimed in claim 7,
   wherein in step II. the resulting stream (SD+S1) is homogenized by means of a first static mixer producing a pressure drop of approximately 8 psig in order to create a mixed stream of SD+S1 of between about 20 to 110 psig.

10. The process for the production of an improved diesel fuel as claimed in claim 7, wherein in step III the third stream S2 is injected by means of a standard "T" connector, at a pressure of between 25 to 125 psig which must be greater than the pressure of the first stream (SD), at a position located after the first static mixer in order to create a stream of SD+S1+S2 at a maximum mass flow of 400 gal/min, wherein the input mass flow of the S2 component will correspond approximately to 1.5 to 3.0% of the SD+S1+S2 flow.

11. The process for the production of an improved diesel fuel as claimed in claim 7, wherein in step III) the stream comprising SD+S1+S2 is homogenized and mixed by means of a second static mixer producing a mixed stream of SD+S1+S2 having a pressure of between 25 to 125 psig at ambient temperature.

12. The process for the production of an improved diesel fuel as claimed in claim 7, wherein in step b) the mixed and homogenized stream of SD+S1+S2 is feed to a Shock Wave Power Reactor (SPR) at a pressure of 25 to 125 psig and at ambient temperature, wherein the SPR reactor comprises a rotor that spins at a velocity of between 600 RPM and 3000 RPM.

13. An improved diesel fuel, wherein the improved diesel fuel is a bipolar diesel fuel having an electrical conductivity of more than 1000 times compared with the electrical conductivity of regular diesel fuel, a lubricity parameter of approximately 0.300 mm, an aromatic content greater than 0, and wherein the improved fuel when burned by a diesel combustion engine reduces the production of soot by more than 30% and reduces the production of NOx with a fuel penalty of from 0 to 3%.

14. The improved diesel fuel as claimed in claim 13, wherein the aromatic content is within a range of 28.6 to 30.5% volume.

15. A process for production of an improved diesel fuel comprising the steps of:

a) mixing and homogenizing the following streams: a first stream (SD) comprising a diesel fuel; a second stream (S1) of a first additive comprising a mixture of ethoxylated esters which is used as surfactant; a third stream (S2) comprising a second additive comprising an aqueous emulsion containing a mixture of water-soluble surfactants and cyclic-aromatic hydrocarbons in order to produce a mixed and homogenized stream comprising SD+S1+S2; and b) converting the diesel fuel contained in the mixed and homogenized stream obtained in step a) into a bipolar diesel fuel by submitting the mixed and homogenized mix to controlled cavitation inside a Shock Power Reactor having a rotor, in order to obtain the improved diesel fuel;

wherein an input mass flow of the S2 component corresponds to 1.5 to 3.0% of SD+S1+S2 flow.

16. The process for the production of an improved diesel fuel as claimed in claim 15, wherein an input mass flow of the S1 component corresponds to 0.9 to 1.5% of the SD+S1+S2 flow.

17. The process for the production of an improved diesel fuel as claimed in claim 15, wherein an input mass flow of the SD component corresponds to 95.5 to 97.6% of the SD+S1+S2 flow.

* * * * *